United States Patent [19]

Day

[11] Patent Number: 5,230,603
[45] Date of Patent: Jul. 27, 1993

[54] CONTROL OF FLOW INSTABILITIES IN TURBOMACHINES

[75] Inventor: Ivor J. Day, Cambridge, England

[73] Assignee: Rolls Royce plc, London, England

[21] Appl. No.: 744,439

[22] Filed: Aug. 13, 1991

[30] Foreign Application Priority Data

Aug. 22, 1990 [GB] United Kingdom ............... 9018457

[51] Int. Cl.$^5$ ............................................. F01B 25/00
[52] U.S. Cl. ..................................... 415/26; 415/185; 415/118; 416/94; 416/245 R
[58] Field of Search ............... 416/245 R, 94; 415/26, 415/180, 183, 185, 914, 119, 125, 118; 244/134 A

[56] References Cited

U.S. PATENT DOCUMENTS

| | | | |
|---|---|---|---|
| 2,401,247 | 5/1946 | Hunter | 244/134 A |
| 2,812,899 | 11/1957 | Meschino | 416/245 R X |
| 2,853,852 | 9/1958 | Bodine, Jr. | 415/914 X |
| 3,936,606 | 2/1976 | Wanke | 415/119 X |
| 4,967,550 | 11/1990 | Acton et al. | 415/119 X |
| 5,005,353 | 4/1991 | Acton et al. | |
| 5,082,421 | 1/1992 | Acton et al. | 415/119 X |

FOREIGN PATENT DOCUMENTS

| | | |
|---|---|---|
| 847286 | 12/1957 | United Kingdom . |
| 800380 | 8/1958 | United Kingdom . |
| 926345 | 5/1963 | United Kingdom . |
| 1008322 | 10/1965 | United Kingdom . |
| 1067129 | 5/1967 | United Kingdom . |
| 1103803 | 2/1968 | United Kingdom . |
| 1139472 | 1/1969 | United Kingdom . |
| 1070548 | 6/1969 | United Kingdom . |
| 1210202 | 10/1970 | United Kingdom . |
| 1357112 | 6/1974 | United Kingdom . |
| 1445384 | 8/1976 | United Kingdom . |
| 1479023 | 7/1977 | United Kingdom . |
| 2191606 | 12/1987 | United Kingdom . |
| 2196390 | 4/1988 | United Kingdom . |

Primary Examiner—Edward K. Look
Assistant Examiner—Todd Mattingly

[57] ABSTRACT

To control unsteady motion phenomena in turbomachines, it has been proposed to employ an active control system to modify the flow conditions. In the present invention, the modification is effected by devices mounted in a bullet or nose bullet at the entry to a rotor of the turbomachine.

7 Claims, 2 Drawing Sheets

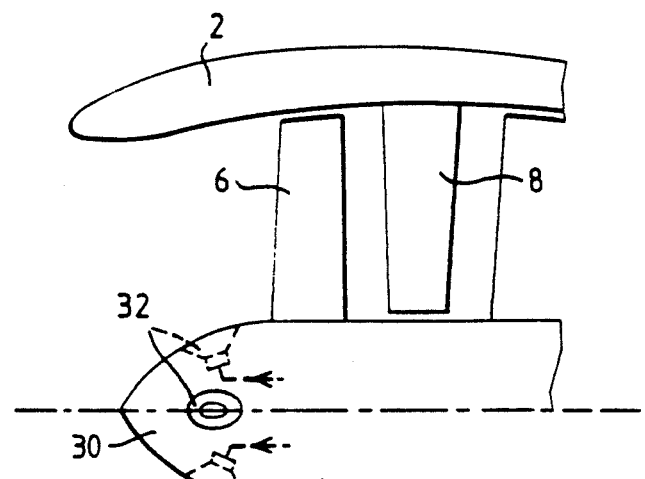
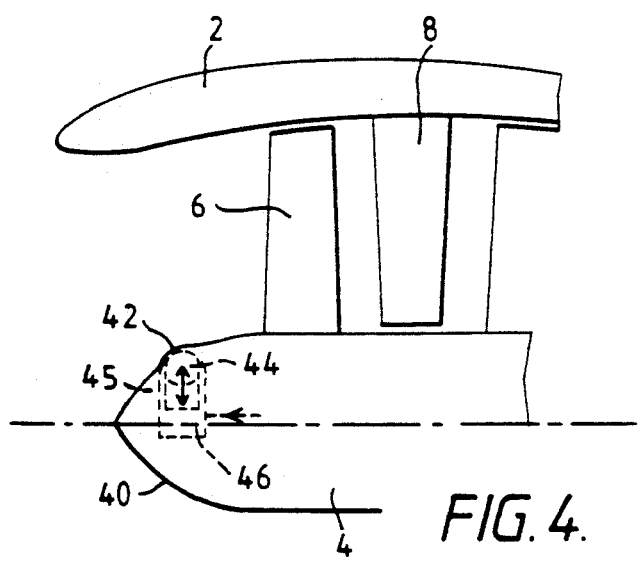
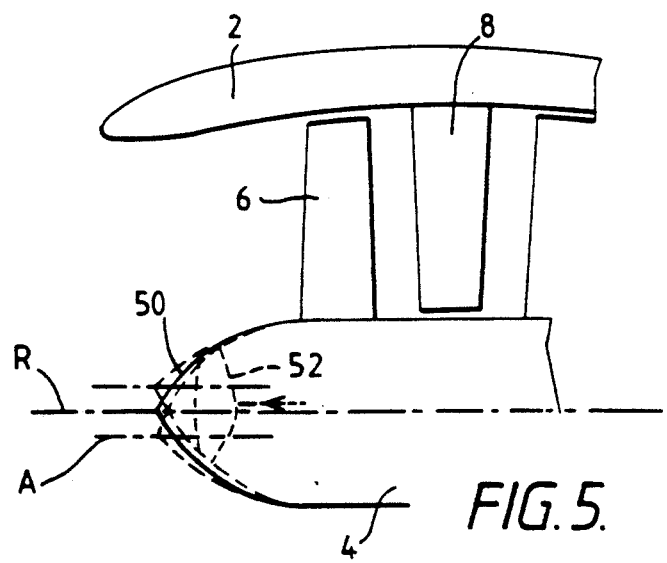

CONTROL OF FLOW INSTABILITIES IN TURBOMACHINES

FIELD OF THE INVENTION

This invention relates to the control of flow in turbomachinery, in particular to the modification of the flow through axial compressors.

BACKGROUND OF THE INVENTION

In GB 2191606A and U.S. Pat. No. 5,005,353 there is described a method of continuous active control in turbomachinery of unsteady motion phenomena such as blade flutter, surge and rotating stall in turbocompressors. The control signals generated by the method described in that earlier patent application are applied in any of a number of possible ways to achieve the desired end. Specifically, the signals may activate actuators which are disposed in the compressor itself by being mounted in the casing wall enclosing the rotary spool with its stators. A variety of devices are proposed for such actuators, including loudspeakers for producing pressure waves, flow injection and bleed valves, heat injection means, and drives for variable angle aerodynamic elements such as stator vanes. By these means symmetric or non-symmetric distortions of the gasflow are generated to ameliorate disturbances sensed in the flow through the compressor.

These different devices are capable of dealing with various forms of flow instability. However, their incorporation in turbomachinery can bring design problems because of the space that must be made available for them. This can be a particular problem in the turbocompressors of aero-engines where accommodating the additional equipment may be deleterious to the aerodynamic efficiency of the engine.

SUMMARY OF THE INVENTION

According to the present invention, a turbomachine is provided with a control system for modifying fluid flow through the turbomachine, the turbomachine having rotor blading for compressing the flow through the turbomachine and nose bullet means upstream of the blading, the control system comprising:

sensor means located to sense undesireable disturbances in the flow of fluid past the blading, actuator means for generating corrective disturbances in the flow of fluid past the blading, the corrective disturbances being corrective to the undesireable disturbances, and signal processing means for driving the actuator means in dependence upon the sensor signals to produce the corrective disturbances, wherein the nose bullet means includes the actuator means, the actuator means being constructed to transiently change the effective profile of the external surface of the bullet means relative to the flow of fluid thereover when driven by the signal processing means, whereby the corrective disturbances are produced in the flow of fluid over the surface of the nose bullet means before the fluid encounters the blading.

The term "nose bullet" is intended to include such items which rotate with the rotor, as well as those which do not.

The actuator means may comprise a plurality of displaceable flaps in the surface of the nose bullet.

Alternatively, the surface actuator means may comprise fluid nozzles or appertures in the surface of the nose bullet connected to a source of fluid pressure or suction. Such a structure changes the effective profile of the nose bullet by blowing or sucking air through the nose bullet surface and hence changing the pressure distribution over the surface of the nose bullet for as long as the blowing or suction is continued. The blowing or suction is under the control of a signal processor.

In further alternatives the actuator means may comprise means, such as electrically driven diaphragms, for generating pressure waves in the flow of air over the nose bullet, means for elastically deforming the external shape of the nose bullet over localised areas, or means for gyrating the whole of the nose bullet about the rotor axis.

In a gas turbine aero-engine having an axial flow turbocompressor it is conventional to provide at an air intake, at the front of the compressor rotor, a forwardly projecting nose bullet to reduce air resistance and guide the airflow through the intake and into the compressor. Similarly, a turbofan aero-engine with a front fan has a nose bullet at the front of the fan rotor. It is specifically such nose bullets that provide a particularly suitable location for said actuators, because such a component is normally empty and because it provides easy access to any mechanisms within it.

Sensing means for sensing the flow of air within a turbocompressor can be located adjacent the blading to produce control signals in response to precursory disturbances in the flow that herald serious conditions such as rotating stall and surge. It may also be useful to locate sensing means adjacent the intake of the compressor to sense inlet flow distortions which could trigger stalling of the blading. By linking those sensing means through a fast-acting signal processing system to the actuators, corrective flow disturbances can be generated by the actuators to counter the disturbances which would otherwise develop into conditions deleterious to the proper working of the compressor.

The control system is of course set up so as to generate the flow disturbances such that they arrive at the affected region of the compressor in antiphase to the sensed instabilities. The control principles of the control system may be in accordance with the teaching of the prior patent specifications GB 2191606A and U.S. Pat. No. 5,005,353. The contents of these patent documents are hereby incorporated by reference. So, for instance, an array of fluid pressure or fluid velocity transducers are provided in a turbocompressor to sense any change in the air flow conditions. Disturbances in the air flow over at least some of the compressor blading that are recognised by the signal processing means to be precursors to the onset of rotating stall or surge, cause the processing means to trigger a suitable response from the actuators, for example generating corrective disturbances that are timed to arrive at the positions of the sensed disturbances in at least approximate anti-phase thereto.

In the case of a turbofan comprising a front fan with a nose bullet and a core engine containing further compressor stages, the flow distortions must pass through the radially innermost portions of the passages between the flanks of adjacent fan blades. Unexpectedly, we have found that this does not significantly affect the performance of the fan.

BRIEF DESCRIPTION OF THE DRAWINGS

Examples of the use of the invention are illustrated in the accompanying schematic drawings, in which:

FIG. 3 is an illustration of the nose bullet of an axial flow compressor with an array of electromagnetically or electrostatically drive diaphragms to control air flow;

FIG. 4 is an illustration of the nose bullet of an axial flow compressor with an elastically deformable outer wall and an internal actuator to deform the wall to control air flow; and FIG. 5 is an illustration of an articulated nose bullet of an axial flow compressor to control air flow.

DESCRIPTION OF THE EMBODIMENT OF THE INVENTION

In each of the figures, reference 2 denotes the casing of a compressor enclosing a rotary spool 4 carrying compressor blades 6 arranged in a series of stages. Stator vanes 8 project inwards from the casing between successive rotary stages on the spool 4. The forward end of the spool terminates in a fairing in the form of a coaxial bullet extending upstream of the blading to guide the fluid flow smoothly into the compressor.

Figure 1:
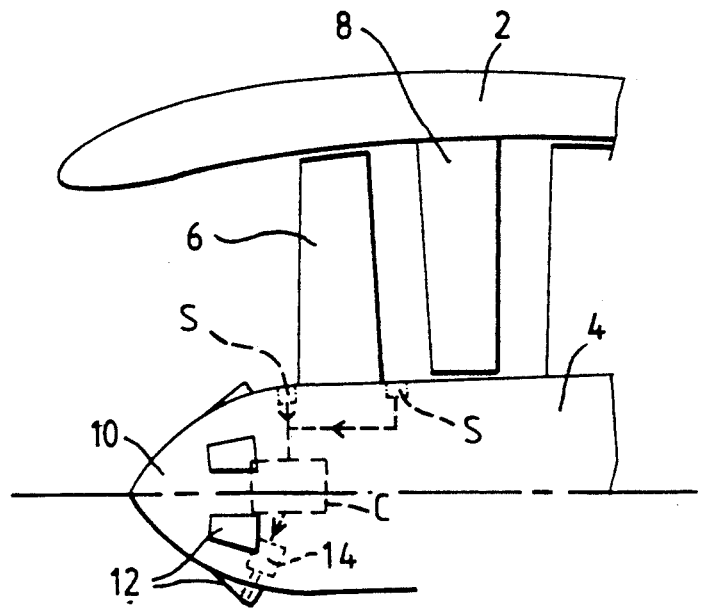
FIG. 1 is an illustration of the nose bullet of an axial flow compressor with pivotable flaps to control air flow.

In the illustrated examples, the bullets are provided with flow control means comprising actuators which have operating mechanisms contained within the bullet. The control signal generating means for these devices can be of the form disclosed in GB 219606A and U.S. Pat. No. 5,005,353. FIG. 1 shows schematically sensors S adjacent the rotor guide vanes and an electronic controller C deriving control signals from the sensor inputs as disclosed in that earlier application. The control signal generating means will not further be described here as reference can be made to the earlier application for further details.

In FIG. 1, on bullet 10 a circumferential array of pivotable flaps 12 normally lie in an inactive position flush with the outer surface of the bullet. By the action of the controller C responding to the signals from the sensors S, the flaps can be rapidly extended and retracted either jointly, or in sub-groups or individually depending upon the nature and location within the compressor of the disturbance sensed, by drive means 14 (e.g. solenoids) operated by the control signals. The extension and retraction of the flaps transiently changes the external shape of the nose bullet. This induces disturbances in the otherwise relatively even airflow over the bullet, and the disturbances move downstream into the compressor passages to modify the conditions there.

For example, if precursory flow distortions indicative of compressor surge have been sensed in the compressor, the flaps may be actuated in unison and at a rate controlled so as to produce corrective flow disturbances which arrive at the affected region of the compressor in anti-phase to the sensed distortions. Multimodal phenomena, such as rotating stall, may be countered by actuating the flaps in circumferential sequence to produce corrective flow disturbances which arrive at the affected region in anti-phase to the individual precursory distortions that have been sensed. The development rates of phenomena, such as rotating stall, will generally require the control system to have a reaction time of less than two revolutions of the compressor rotor for acting upon a sensed distortion, although a longer period may be available for the safe suppression of the distortion.

Alternative forms of the actuator for disturbing the airflow over a nose bullet in order to modify the compressor flow are illustrated in FIGS. 2-5.

Figure 2:
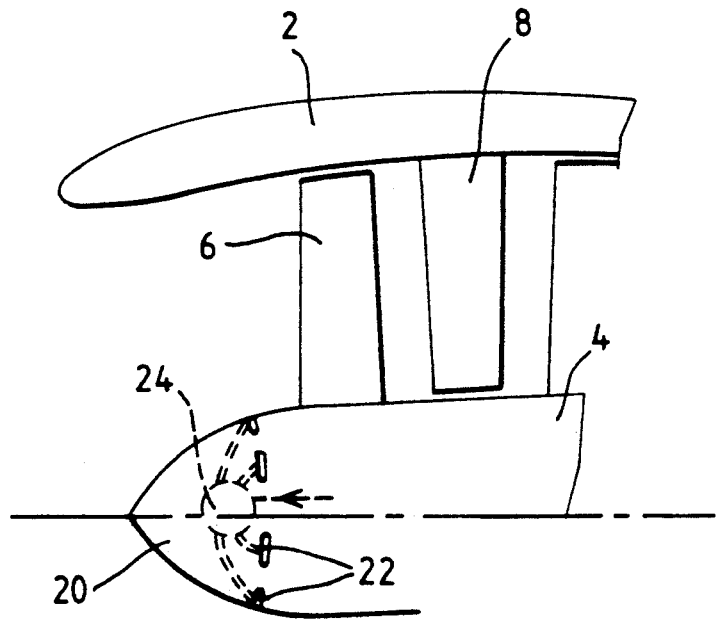
FIG. 2 is an illustration of the nose bullet of an axial flow compressor with a nozzle array to control air flow.

FIG. 2 shows a bullet 20 with a circumferential array of nozzles or apertures 22 opening onto its outer surface. Pumping means 24, connected to the nozzles, can be operated analogously to the example of FIG. 1 by the controller C, either by blowing or suction through the nozzles or apertures. For blowing, the source of air can conveniently be the compressor itself, in which case the signal processor would be connected to operate suitable fast acting on/off valves in supply lines to the nozzles or apertures.

The bullet 30 of FIG. 3 has a circumferential array of electromagnetically or electrostatically driven diaphragms 32 in its surface to produce pressure waves when operated by the control signals from the controller C.

In FIG. 4, the bullet 40 comprises a flexible elastically deformable outer wall 42 and an internal actuator device 44 that is moved outboard on radial arms 45 and rotated about the nose bullet axis by a motor 46 at a rate determined by the control signals to deform the external profile of the bullet. Alternatively, a circumferential array of internal plungers or rams may be operated by solenoids or the like, selectively or as a single group, to deform the bullet and hence modify the entering airflow in ways similar to the previous examples.

In the case of FIG. 5, a bullet 50 has an articulated or flexible construction to permit it to be displaced by an internal actuator 52 into an eccentric position and to gyrate its axis A about the spool rotary axis R in accordance with the control signals.

One problem which affects the practicability of active control systems for gas turbine engines is difficulty in finding sufficient space within an engine to contain actuator mechanisms without intruding on the aerodynamic lines of the gas passages. The nose bullet, in contrast, is generally completely empty and, therefore, is able to accommodate the actuating means without difficulty. The availability of space in this location also gives greater freedom for the design of the actuating means and its operating system. Furthermore, with some forms of actuating means it may not be feasible to deploy them in the interior of the engine, such as the example of FIG. 5.

Although not drawn as such, some of the embodiments described above are applicable to turbofan engines of the type comprising a front fan with a spinning nose bullet attached to it, the front fan feeding part of its output to a core engine containing compressor stages. The inlet to such core engines is generally only a short distance downstream of the nose bullet and it is found that flow disturbances of the type which would be generated by the actuating means discussed above readily pass through the fan and into the core compressor without adversely affecting the fan.

For the embodiments of FIG. 4, as shown, and FIG. 5, it is necessarily the case that the bullet could not be rotationally balanced to a sufficient extent to withstand high rotational speeds. Hence, it is likely that such mechanisms would only be used in conjunction with non-rotating nose bullets.

It will be understood that it is possible to combine different ones of the actuators described in the same control system, so the different forms described above should not necessarily be thought of as strict alternatives to each other.

What is claimed is:

1. A control system for a turbomachine having a front fan and a core engine containing further compressor stages, the front fan feeding part of its output to the core engine, the control system for modifying fluid flow through the turbomachine, the turbomachine having rotor blading for compressing the flow through the turbomachine and nose bullet means attached to the fan upstream of the blading, the control system comprising:

sensor means located to sense precursory disturbances in the flow of fluid past the blading, said precursory disturbances being disturbances which develop into unstable flow conditions deleterious to the proper working of the compressor stages;

actuator means for generating corrective disturbances in the flow of fluid past the blading, the corrective disturbances being corrective to the precursory disturbances; and signal processing means for driving the actuator means in dependence upon the sensor signals to produce the corrective disturbances, wherein the nose bullet means includes the actuator means, the actuator means being constructed to transiently change the effective profile of an external surface of the bullet means relative to the flow of fluid thereover when driven by the signal processing means, whereby the corrective disturbances are produced in the flow of fluid over the surface of the nose bullet means before the fluid encounters the blading, and the corrective disturbances passing between adjacent fan blades adjacent their radially inner ends without adversely effecting the performance of the fan, to thereby enter the core engine to modify fluid flow therein.

2. A turbomachine according to claim 1 wherein the actuator means comprises a plurality of displaceable flaps.

3. A turbomachine according to claim 1 wherein the actuator means comprises fluid blowing means.

4. A turbomachine according to claim 1 wherein the actuator means comprises fluid suction means.

5. A turbomachine according to claim 1 wherein the actuator means comprises at least one pressure wave generating device.

6. A turbomachine according to claim 1 wherein the actuator means comprises means for elastically deforming the external shape of said bullet or nose bullet.

7. A turbomachine according to claim 1 wherein the actuator means comprise means for gyrating said nose bullet about the rotor axis.

* * * * *